(12) United States Patent
Mori

(10) Patent No.: US 8,530,743 B2
(45) Date of Patent: Sep. 10, 2013

(54) WATER DRAIN STRUCTURE FOR WIRE HARNESS

(75) Inventor: Akihiro Mori, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 391 days.

(21) Appl. No.: 12/995,563

(22) PCT Filed: Dec. 1, 2008

(86) PCT No.: PCT/JP2008/071818
§ 371 (c)(1),
(2), (4) Date: Dec. 1, 2010

(87) PCT Pub. No.: WO2009/147759
PCT Pub. Date: Dec. 10, 2009

(65) Prior Publication Data
US 2011/0083899 A1  Apr. 14, 2011

(30) Foreign Application Priority Data
Jun. 3, 2008  (JP) ................... 2008-146307

(51) Int. Cl.
*H01B 7/00* (2006.01)
*H02G 3/04* (2006.01)
*H01R 13/52* (2006.01)

(52) U.S. Cl.
USPC ............. 174/72 A; 174/89; 174/91; 174/92

(58) Field of Classification Search
USPC ...................... 174/72 A, 89, 91, 92
See application file for complete search history.

(56) References Cited

U.S. PATENT DOCUMENTS

| 5,641,942 | A | * | 6/1997 | Iriyama et al. | 174/72 A |
| 5,792,995 | A | * | 8/1998 | Takeda et al. | 174/153 G |
| 5,940,962 | A | * | 8/1999 | Shima et al. | 29/825 |
| 7,202,415 | B2 | * | 4/2007 | Fujita | 174/72 A |
| 7,572,979 | B2 | * | 8/2009 | Otsuki et al. | 174/84 R |
| 7,952,020 | B2 | * | 5/2011 | Yamamoto et al. | 174/23 R |
| 2011/0272193 | A1 | * | 11/2011 | Nishimura et al. | 174/72 A |

FOREIGN PATENT DOCUMENTS

| JP | 56-140105 | | 10/1981 |
| JP | 60-96122 | | 5/1985 |
| JP | 61-22128 | | 2/1986 |
| JP | 61-46820 | | 3/1986 |
| JP | 3-70006 | | 7/1991 |
| JP | 07073741 | | 9/1993 |
| JP | 8-275349 | | 10/1996 |
| JP | 10224940 | A * | 8/1998 |

(Continued)

*Primary Examiner* — Timothy Thompson
*Assistant Examiner* — Nathan Milakovich
(74) *Attorney, Agent, or Firm* — Gerald E. Hespos; Michael J. Porco; Matthew T. Hespos

(57) ABSTRACT

To improve water discharging performance of a wire harness, and to protect a water discharging structure of the wire harness, an electric wire group is exposed from an outer cover material at a lower end portion (B) where the wire harness (10) is arranged, one side of the exposed portion is surrounded by a first waterproof material, the other side of the exposed portion is surrounded by a second waterproof material, the first waterproof material (I) forms an opening (27) at the lower end portion (B), the end of the second waterproof material is inserted into the first waterproof material (I) from the opening (27) so as to overlap on the first waterproof material, and a water discharging gap (28) is formed at a wrapped portion (C).

9 Claims, 11 Drawing Sheets

(56) References Cited

FOREIGN PATENT DOCUMENTS

| | | | | |
|---|---|---|---|---|
| JP | 11-266516 | | | 9/1999 |
| JP | 2004210158 | A | * | 7/2004 |
| JP | 2007-12519 | | | 1/2007 |
| JP | 2008195182 | A | * | 8/2008 |
| JP | 2010063317 | A | * | 3/2010 |
| JP | 2010068666 | A | * | 3/2010 |

* cited by examiner

WATER DRAIN STRUCTURE FOR WIRE HARNESS

BACKGROUND OF THE INVENTION

1. Field of the Invention

The present invention relates to a water discharging structure of a wire harness. More specifically, the present invention relates to a structure that drains water, which has entered from a gap between an electric wire group of the wire harness and an exterior member to a portion between the electric wires, to the outside.

2. Description of the Related Art

Hitherto, a wire harness arranged in a vehicle is half-wrapped by a vinyl chloride tape or the like or is attached with an annular tube or a corrugated tube including a vinyl tube made of resin or hard vinyl tube and provided with an outer covering, thereby promoting the protection of electric wires from external interference such as maintenance, restriction, or contact or friction of the electric wire.

On the other hand, as shown in FIG. 17, in an area exposed to water such as an engine room, water droplets 3 seep in between the lines of an electric wire 1 from a winding end place X1 of a tape 2 in a portion W-1 that is wired in an up and down direction of a wire harness W, a junction point X2 of the wire harness, an upward opening portion X3 of a connector or the like. In this case, the water droplets 3 seeping in between the lines cannot be discharged to the outside by the half-wrapped tape 2 and gather, and there are cases where the water droplets 3 reach up to the connector 4 due to a capillary phenomenon. In this manner, when seepage is generated in the connector 4, shorting may occur, and when a splice portion exists in the seepage area, rust is generated in the splice portion and there is a concern that there may be deterioration in quality.

Regarding the above-mentioned problem, JP-A-60-96122 proposes a water discharging structure shown in FIG. 18. This is a structure in which a portion near a car body panel 5 on an engine room side of the wire harness W/H is bent in a U shape and fixed by winding a protector 6 and a tape 7 therearound, a bend portion 8 is disposed while being protruded downward, and on the other hand, a drain portion 9 in which the electric wire w is exposed without being wound by the tape is provided at the front end of the bend portion 8, whereby the drain portion 9 discharges the water which entered from the gap between the electric wire w in the wire harness W/H and the tape 7.

However, since the drain portion 9 is an electric wire exposure portion where the tape 7 which is an exterior material is not wound therearound, the electric wire cannot be protected from external forces such as a collision with small stones which are spattered, contact with an edge of the car body panel, or interference or interposition due to other components during vehicle driving, whereby there is a concern that the electric wire of the exposure portion may be damaged.

SUMMARY OF THE INVENTION

The present invention was made in view of the above-mentioned problem, and an object thereof is to have excellent drain performance and prevent damage of an electric wire exposure portion in a water discharging structure of the wire harness which removes water that has seeped in from a gap between an electric wire group of a wire harness and an exterior material and is progressively intruding to the inside due to the capillary phenomenon.

In order to solve the problem, according to a first aspect of the invention, there is provided a water discharging structure of a wire harness, wherein: at both side portions pinching therebetween a lower end position of a wire harness arranged in a vehicle, a tape is half-wrapped around an electric wire group of the wire harness and is passed through an inner portion of a tube formed of an annular tube or a corrugated tube made of resin, and at the lower end position, the electric wire group is exposed without the tape winding or being passed through the tube; in an area where the electric wire group is exposed, one side of the electric wire group pinching the lower end position therebetween is provided with an outer covering of a first waterproof material, and the other side thereof is provided with an outer covering of a second waterproof material, the first waterproof material is opened at the lower end position, a front end portion of the second waterproof material is inserted in and wrapped around the inner portion from an opening of the first waterproof material, and a water discharging gap is opened in the wrapped portion; and the first waterproof material and the second waterproof material are formed of a waterproof tube having a slit in a longitudinal direction or a waterproof sheet wound around the electric wire group, and are attached to the electric wire group from a side part perpendicular to the longitudinal direction.

A water discharging structure of the present invention uses a first waterproof material and a second waterproof material that are separate from each other, whereby the wire harness can be easily bent at a joint of the first waterproof material and the second waterproof material and the lowest lower end position can be easily formed. Furthermore, since the electric wire group is exposed in the lower end position and a water discharging gap is provided between the first waterproof material and the second waterproof material that are wrapped around each other in the lower end position, the water, which has entered between the electric wire group of the wire harness and the tape or within the tube, can be effectively discharged without gathering to the outside from the water discharging gap of the lower end position.

In addition, since the lower end position, where the tape is not wound or the resin tube or the corrugated tube formed of the vinyl tube, or the hard vinyl tube is not provided with an outer covering, is covered with the wrapping portion of the first waterproof material and the second waterproof material and the electric wire group is not exposed to the outside, it is possible to protect the wire from interference from small stones which are spattered, the car body panel, other components or the like during vehicle driving, whereby wire damage can be prevented.

The first waterproof material is formed of the waterproof sheet made of resin, the waterproof sheet is wound around the electric wire group, and both side ends thereof are joined and fixed to each other, the second waterproof material is formed of the waterproof tube made of resin, and a volume in which the electric wire group is surrounded by the waterproof sheet is larger than that of the waterproof tube.

In this manner, by forming the first waterproof material to wrap around the outside of the second waterproof material as a waterproof sheet attached by winding, a joint value of both side ends of the first waterproof material can be regulated, whereby the size of the water discharging gap formed in the wrapped portion can be minutely adjusted. Moreover, when a waterproof sheet is used for the first waterproof material, the joint of both side ends is not performed at the front end side of the first waterproof material and can be opened in the shape of a slit, whereby the front end of the first waterproof material is easily wrapped around the outside of the second waterproof material at a position exceeding the bent lower end position.

On lower surfaces of front end portions of the second waterproof material to be wrapped with the first waterproof material, a drain cutout portion of the front end opening may be provided, or a drain cutout portion may be provided from the opening end on the lower surface of the first waterproof material, and a drain cutout portion may be provided from the front end in a wrapped portion of the second waterproof material and at a position that does not overlap with the drain cutout portion of the first waterproof material.

In this manner, by providing a drain cutout, the water discharging efficiency can be further improved. Furthermore, in a case where the drain cutout is provided only in the front end portion of the second waterproof material, since the first waterproof material is wrapped around the outside of the drain cutout, the exposure of the electric wire group can be prevented. Furthermore, even in a case where the drain cutouts are provided in both the first waterproof material and the second waterproof material, since the drain cutouts do not overlap with each other, the electric wire group can be protected without being exposed to the outside while drain performance is improved.

The wire harness with an area which is provided with an outer covering of the second waterproof material and the first waterproof material may be formed in a V shape in advance in which the lower end position is protruded downward.

As a result, since the lower end position of the wire harness can be stably held, it is possible to prevent positional difference between the lower end position which is a water discharging point and the wrapped portion of the first waterproof material and the second waterproof material.

A V shaped bend holding plate may be disposed on the upper surface of the wire harness of the bent portion, and the bend holding plate may be wound around the electric wire group by a tape or attached by a fastening band, and together with the electric wire group The bend holding plate is attached as the above, the position of the water discharging is reliably determined as the lowest lower position.

Alternatively, on a lower surface of the wire harness with an area that is provided with an outer covering of the first waterproof material and the second waterproof material, a V-shaped bend holding plate may be disposed, the bend holding plate may be wound around the electric wire group by a tape or attached by a fastening band, the bend holding plate may open a water discharging hole in a lower peak portion and protective walls protrude from both sides of the water discharging hole; and drain cutout portions may be provided from the front ends of the first waterproof material and the second waterproof material, the drain cutout portions may overlap with each other, and the protective walls of the bend holding plate may protrude from the drain cutout portions to the outside.

In this manner, even in a case of disposing a bend holding plate at a lower surface side of the wire harness, by opening a water discharging hole at a lower peak portion of the bend holding plate, the water which has entered from the gap between the exterior material and the electric wire group can be discharged from the water discharging hole without gathering.

Furthermore, by protruding a protective wall from both sides of the water discharging hole of the bend holding plate, it is possible to impede small stones which are spattered, the car body panel or the like during driving from entering in from the water discharging hole, whereby inner wire damage can be prevented.

According to a second aspect of the invention, there is provided a water discharging structure of a wire harness, wherein: at both side portions pinching therebetween a lower end position of a wire harness arranged in a vehicle, a tape is half-wrapped around an electric wire group of the wire harness and is passed through an inner portion of a tube formed of an annular tube or a corrugated tube made of resin, and at the lower end position, the electric wire group is exposed without the tape winding or the tube being provided as an outer covering; a V-shaped bent area where the electric wire group is exposed is provided with an outer covering of a waterproof tube that is molded in a V shape, and a plurality of small water discharging holes is arranged in a lower peak portion of the waterproof tube; and the waterproof tube has a slit in a longitudinal direction and is attached to the electric wire group from a side part perpendicular to the longitudinal direction.

In this manner, by providing the wire harness with an outer covering of the waterproof tube molded in a V shape in advance, a small hole for the water discharging hole provided in the waterproof tube can be stably disposed in the lowest lower position of the wire harness, whereby effective water discharging is always possible.

It is preferable that protective ribs protrude from the waterproof tube at both sides of the small water discharging hole forming portion.

According to the protective ribs, it is possible to impede foreign matter, which is threw up while the vehicle is moving, from entering in from the small water discharging hole, whereby damage of the internal electric wire can be prevented.

According to a third aspect of the invention, there is provided a method of manufacturing a wire harness for a vehicle wire arrangement having a water discharging structure, wherein:

on an assembly worktable of the wire harness, an electric wire group is supported by a wiring jig standing up from the assembly worktable and is wired in a horizontal direction, and a wiring path is bent and wired in a portion which is a lower end position at the time of a vehicle arrangement; a V shaped bend holding plate is wound around the electric wire group by a tape or attached by a fastening band at an inner peripheral side or an outer peripheral side of the bend portion, and the bend holding plate attached to the outer peripheral side provides a water discharging hole at a lower peak; and a direction of a portion bent in the horizontal direction on the assembly worktable is changed to a vertical direction at the time of the vehicle arrangement, the bend holding plate is disposed at an upper surface side or a lower surface side, and the electric wire group is exposed at the lower surface side.

As described above, according to the present invention, at a lower end position of the wire harness, the first waterproof material and the second waterproof material that are separated from each other are wound and provided with an outer covering, or the waterproof tube molded in a V shape is provided with an outer covering, and in the lower end position, the electric wire is exposed without being wound with a tape and a water discharging gap or a small water discharging hole is formed in the exterior material. Thus, the position of the water discharging gap or the small water discharging hole can be stably disposed in the lowest lower position becoming the water discharging point of the wire harness, whereby the water which has entered from the gap between the electric wire group of the wire harness and the exterior member can be always effectively discharged to the outside.

Moreover, in a case where the lower end position of the wire harness is provided with an outer covering of the first waterproof material and the second waterproof material, the wire exposure position that is not wound with the tape is covered with the wrapping place of the first waterproof material and the second waterproof material. Thus, the electric wire exposure portion can be protected from interference from small stones which are spattered or the car body panel.

Otherwise, in a case where the lower end position of the wire harness is provided with an outer covering of the waterproof tube, the water discharging hole formed in the waterproof tube is formed by a plurality of small holes. Furthermore, by protruding protective ribs at both sides of the small water discharging hole, foreign matter is prevented from entering into the waterproof tube, whereby damage to the electric wire exposure portion can be prevented.

BRIEF DESCRIPTION OF THE DRAWINGS

FIG. 8A is a perspective view of a water discharging structure, and FIG. B is an exploded view of each waterproof sheet used in the first waterproof material and the second waterproof material shown in FIG. 8A.

FIG. 9A is a perspective view of a water discharging structure, and FIG. 9B is an exploded view of each waterproof sheet used in the first waterproof material and the second waterproof material shown in FIG. 9A.

FIG. 11A is a projection perspective view of a principal part, and FIG. 11B is an explanation cross-sectional view.

FIG. 12A is a perspective view thereof, and FIG. 12B is a bottom view thereof.

FIG. 13A is a perspective view thereof, and FIG. 12B is a bottom view thereof.

DETAILED DESCRIPTION OF THE PREFERRED EMBODIMENTS

Hereinafter, embodiments of the present invention will be described with reference to the drawings.

Figure 1:
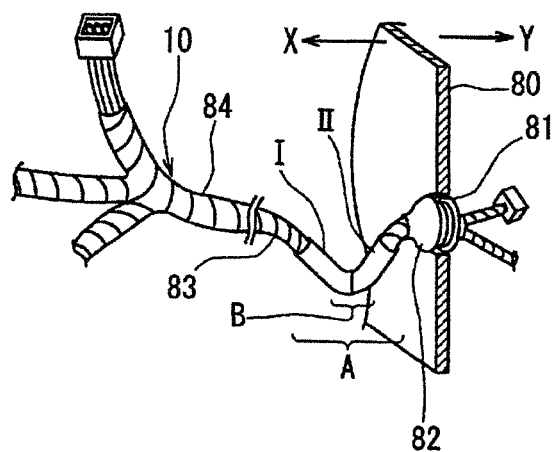
FIG. 1 is a cut-away perspective view of a principal part that shows the state in which a wire harness including a water discharging structure according to a first embodiment of the present invention is wired in a vehicle body.

As shown in FIG. 1, all of the embodiments apply the present invention to a water discharging structure of a wire harness 10 that is wired in an engine room of an automobile. The wire harness 10 is inserted into a grommet 82 attached to a through hole 81 of a car body panel 80 dividing an engine room X and a cabin Y of an automobile, thereby forming a drain portion A at the engine room X side adjacent to the attachment position of the grommet 82.

Areas other than the drain portion A of the wire harness 10 are half-wrapped by a tape 83. The tape 83 is formed of an adhesive tape.

Figure 3:
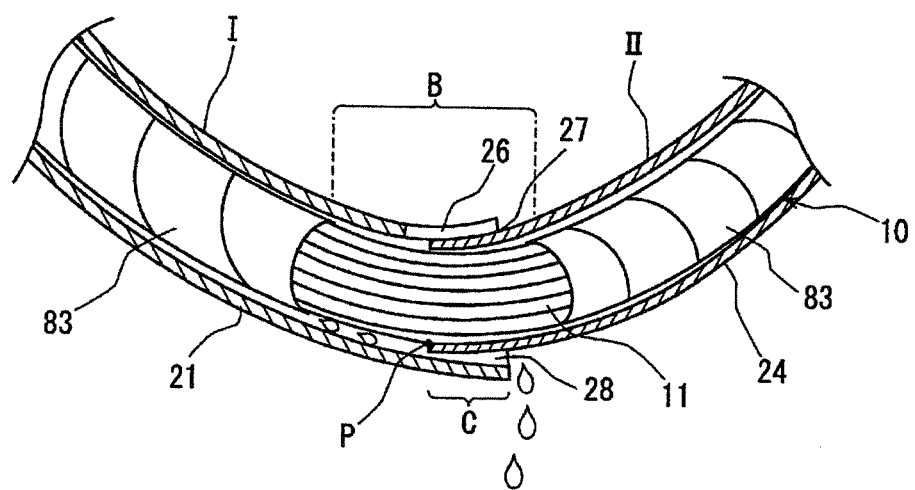
FIG. 3 is a cross-sectional explanation diagram showing a water discharging structure according to the first embodiment.

Furthermore, as shown in FIG. 3, in all of the embodiments, the wire harness 10 is bent downward so that the lowest position is disposed in the drain portion A, an electric wire exposure portion is formed in a lower end position B without being wound by the tape 83, and both side portions pinching the electric wire exposure portion therebetween are half-wrapped by the tape 83 as described above.

FIGS. 1 to 5 show a first embodiment of the present invention.

Figure 2:
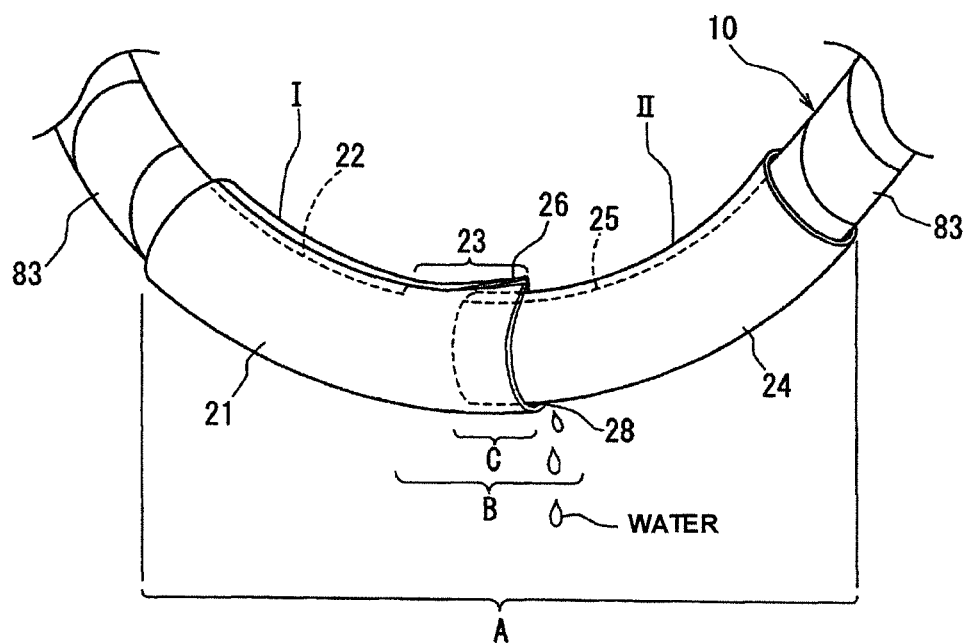
FIG. 2 is an enlarged perspective view of a drain portion shown in FIG. 1.

As shown in FIGS. 2 and 3, the drain portion A of the wire harness 10 provides an outer covering to a first waterproof material I at one side pinching the lower end position B and a second waterproof material II at the other side thereof.

Figure 4:
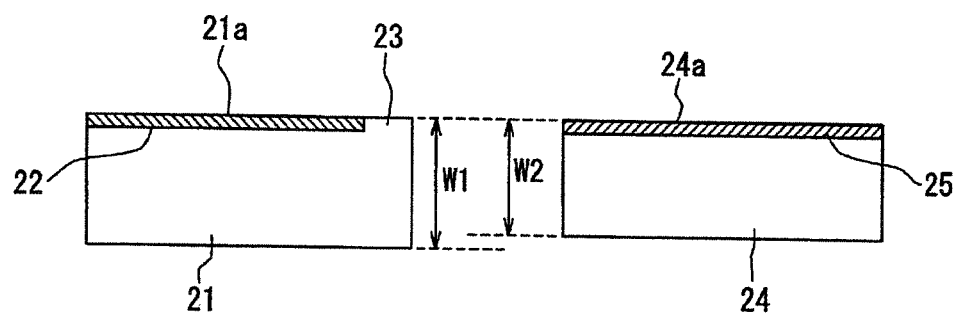
FIG. 4 is an exploded view of each waterproof sheet used in the first waterproof material and the second waterproof material shown in FIG. 2.
Figure 5:
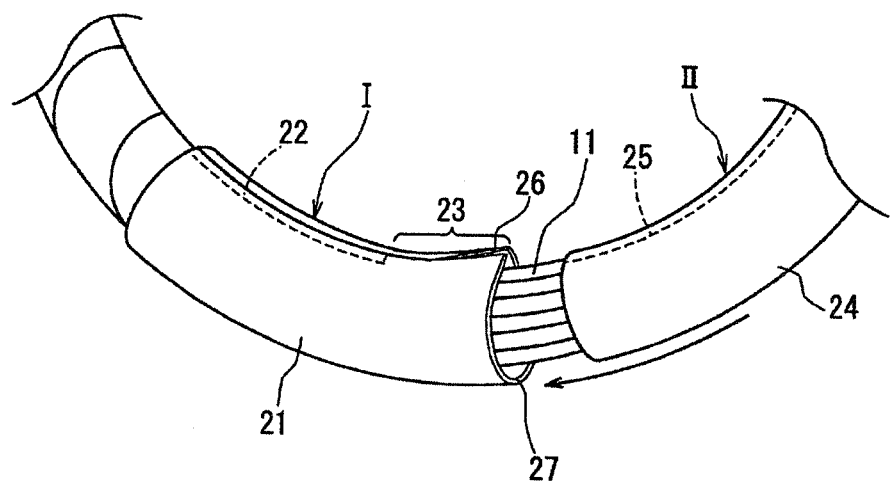
FIG. 5 is a perspective view showing a process of wrapping the first waterproof material and the second waterproof material.

As shown in FIG. 4, the first waterproof material I is formed of a waterproof sheet 21 made of vinyl chloride that is wound around and attached to an outer periphery of the wire harness 10. At one side edge 21a in the winding direction of the waterproof sheet 21, an adhesive is applied along the one side edge 21a to form an adhesive portion 22; however, at an end side in a longitudinal direction of the one side edge 21a, the adhesive portion 22 is not provided but a non-adhesive portion 23 of a required length is provided.

Similarly to the first waterproof material I, the second waterproof material II is also formed of a waterproof sheet 24 made of vinyl chloride wound around and attached to an outer periphery of the wire harness 10, but a width W2 (a length in the winding direction) of the waterproof sheet 24 is cut so as to be smaller than a width W1 of the waterproof sheet 21 for the first waterproof material I.

An adhesive portion 25 is formed along the whole length of the one side edge 24a of the waterproof sheet 24.

When the first waterproof material I is attached to the electric wire group 11 on one side pinching the lower end position B, as shown in FIG. 2, the waterproof sheet 21 is wound with the non-adhesive portion 23 disposed at the lower end position B side. The both ends are joined and fixed by the adhesive portion 22, but both side ends of the lower end position B side are not joined due to the non-adhesive portion 23 but are open in the shape of a slit 26.

In this manner, the first waterproof material I attached to a tubular shape disposes the slit 26 at the upper surface of the wire harness 10, and, as shown in FIG. 3, opens the slit 26 and covers the front end portion thereof up to the other side exceeding a lower peak position P of the lower end position B.

When the second waterproof material II is attached to the electric wire group 11 on the other side pinching the lower end position B, the waterproof sheet 24 is wound around the electric wire group 11 and the both ends are joined and fixed by the adhesive portion 25. The second waterproof material II, which is attached in the tubular shape in this manner, is inserted in and wrapped around the front end portion more to the inner portion than the front end opening 27 of the waterproof material I attached to the front end. As a result, as shown in FIG. 2, a wrapped portion C is formed in the lower end position B, but, at this time, as shown in FIG. 3, the front end portion of second waterproof material II does not exceed the lower peak position P.

In the wrapped portion C of the first waterproof material I and the second waterproof material II, as shown in FIGS. 2 and 3, the outer peripheral surface of the second waterproof material II is not brought into close contact with the inner peripheral surface of the first waterproof material I, and a water discharging gap 28 is formed. The width W1 of the waterproof sheet 21 of the first waterproof material I and the width W2 of the waterproof sheet 24 of the second waterproof material II are each set to be sizes so that the water discharging gap 28 can be formed in the wrapped portion C.

In this manner, the first waterproof material I and the second waterproof material II are wrapped and attached around the drain portion A of the wire harness 10 to dispose the wrapped portion C in the lower end position B and form the water discharging gap 28 in the wrapped portion C. As a result, as shown in FIG. 3, it is possible to effectively drain water from the lower end position B, which is a position where water which has entered from the gap between the tape 83 of the wire harness 10 and the electric wire group 11 has gathered, to the outside via the water discharging gap 28.

Furthermore, by attaching the first waterproof material I and the second waterproof material II that are separated from each other at both sides pinching the lower end position B therebetween, the bent shape of the wire harness 10 and the lower end position B can be stably held. Thus, it is possible to prevent a decline in drain performance due to a position deviation between the lower end position B which is the water discharging point and the wrapped portion C which forms the water discharging gap 28.

In addition, since the slit 26 is formed on the upper surface of the front end portion of the first waterproof material I, the first waterproof material I and the second waterproof material II can be easily and stably wrapped by opening the slit 26. In addition, since the front end portion lower surface side of the first waterproof material I can be tilted in the downward direction, it is possible to obtain a structure in which the water discharging gap 28 can be easily secured and drain performance is also excellent.

Additionally, the electric wire exposure portion exists in the lower end position B, but since the joint of the first waterproof material I and second waterproof material II is wrapped, the electric wire exposure portion is covered with the first waterproof material I or the second waterproof material II and is not exposed to the outside. Thus, it is also possible to prevent wire damage to the electric wire exposure portion due to interference from external forces.

Figure 6:
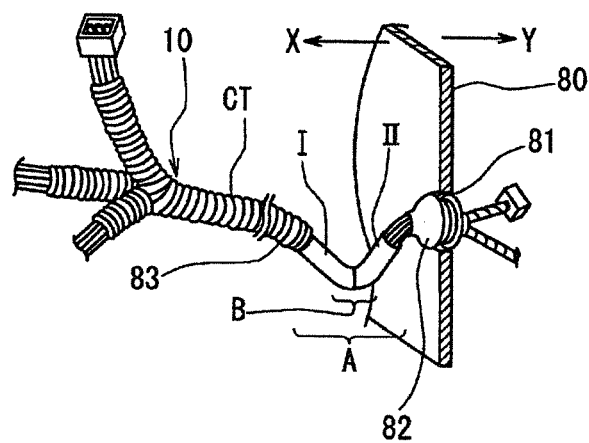
FIG. 6 is a perspective view showing a modified example of the first embodiment.

In the first embodiment, the areas other than the drain portion A of the wire harness 10 are half-wrapped by the tape 83, but as shown in FIG. 6, the areas may be provided with an outer covering of a corrugated tube CT without the slit instead of the half-wrapping by the tape. In this case, at both ends pinching the drain portion A of the corrugated tube CT therebetween, the first waterproof material I and the second waterproof material II are wound around the electric wire group from an area situated in the inner portion from the front end of the corrugated tube CT by a required amount.

Furthermore, instead of the corrugated tube, an annular tube made of resin formed of a vinyl tube or a hard vinyl tube may be used.

Figure 7A:
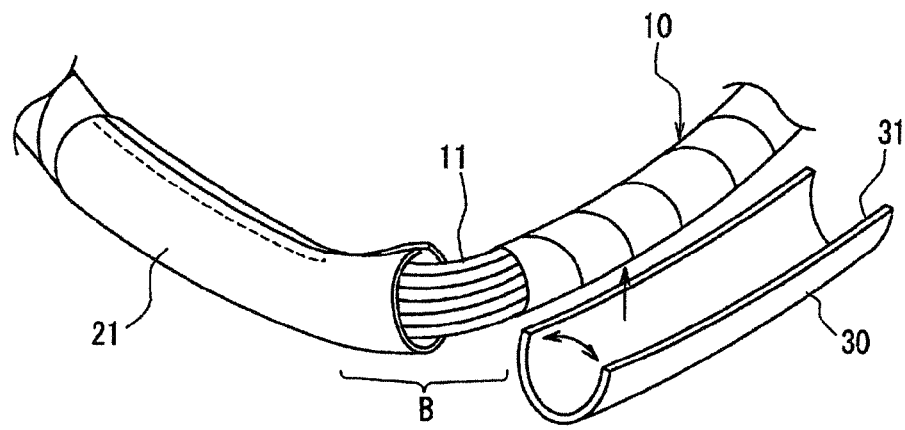
FIGS. 7A to 7C show a second embodiment, and are explanation perspective views that show attachment processes of the second waterproof material to the electric wire group.
Figure 7B:
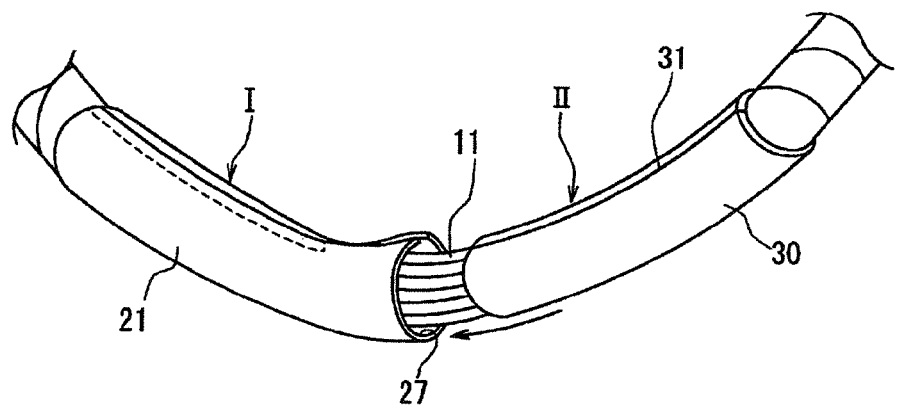
Figure 7C:
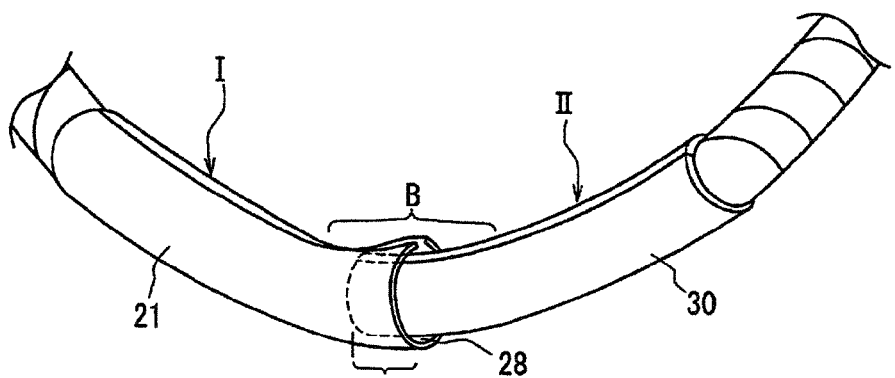

FIGS. 7A to 7C show a water discharging structure according to a second embodiment of the present invention.

The present embodiment uses a waterproof tube 30 made of vinyl chloride or polypropylene as the second waterproof material II. The waterproof tube 30 has a slit 31 over the whole length in a longitudinal direction, and as shown in FIG. 7A, is attached from the side part of the electric wire group 11 by opening the slit 31. As shown in FIG. 7B, the front end portion of the waterproof tube 30 is inserted into the inner portion and wrapped around a front end opening 27 of the waterproof sheet 21 of the first waterproof material I attached to the tip portion, and as shown in FIG. 7C, the wrapped portion C is disposed in the lower end position B.

The outer diameter of the waterproof tube 30 is set so that the volume surrounding the electric wire group 11 with the waterproof sheet 21 of the first waterproof material I is greater than the volume surrounding the electric wire group 11 with the waterproof sheet 30. Furthermore, the wrapped portion C is set to the size so that the water discharging gap 28 can be formed between the inner peripheral surface of the waterproof sheet 21 and the outer peripheral surface of the waterproof tube 30, and has a structure that can effectively drain water to the outside via the water discharging gap 28 from the lower end position B where water gathers.

Figure 8A:
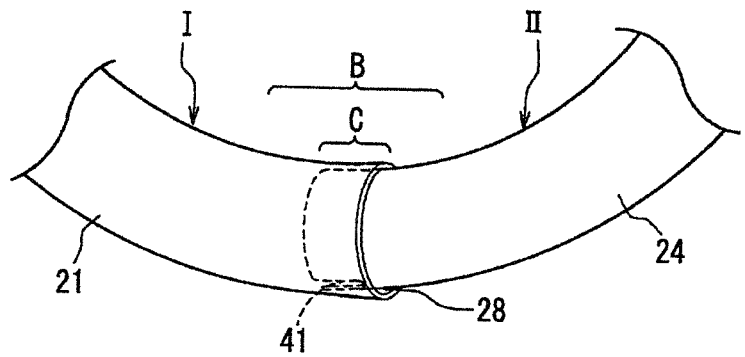
FIGS. 8A and 8B show a third embodiment.
Figure 8B:
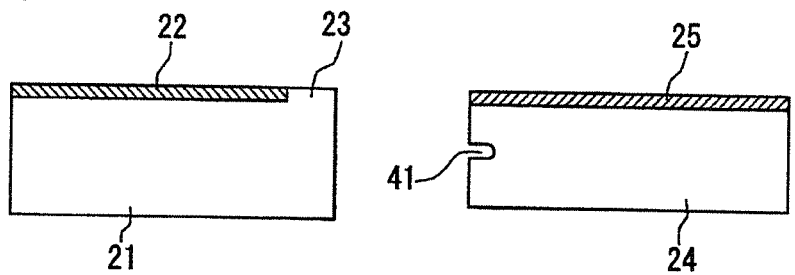

A water discharging structure according to a third embodiment of the present invention is shown in FIGS. 8A and 8B.

Similarly to the first embodiment, in the present embodiment, the first waterproof material I formed of the waterproof sheet 21 is attached at one side pinching the lower end position B, the second waterproof material II formed of the waterproof sheet 24 is attached at the other side thereof, and the wrapped portion C is disposed in the lower end position B. However, a drain cutout portion 41 of the front end opening is formed at the front end portion lower surface side of the second waterproof material II. The rest of the configuration is the same as that of the first embodiment, and thus, the same reference numerals are denoted and the descriptions thereof will be omitted.

In this manner, by forming the drain cutout portion 41 at the front end portion lower surface side of the second waterproof material II that is inserted into the wrapped portion C, drain performance can be further improved. Furthermore, since the outer side of the drain cutout portion 41 is covered with the front end portion of the first waterproof material I, foreign matter such as a small stone is prevented from entering in from the drain cutout portion 41, which makes it possible to prevent damage of the electric wire exposure portion.

Figure 9A:
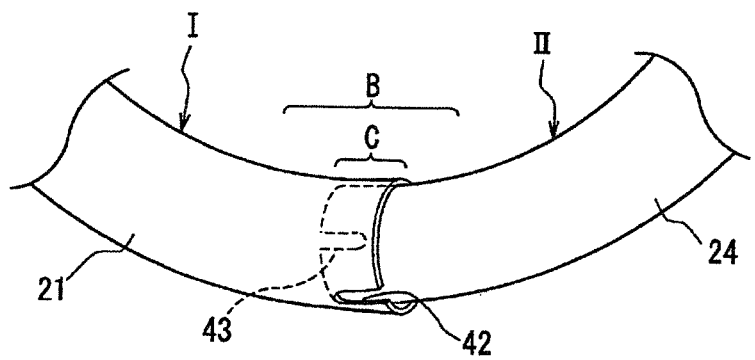
FIGS. 9A and 9B show a fourth embodiment.
Figure 9B:
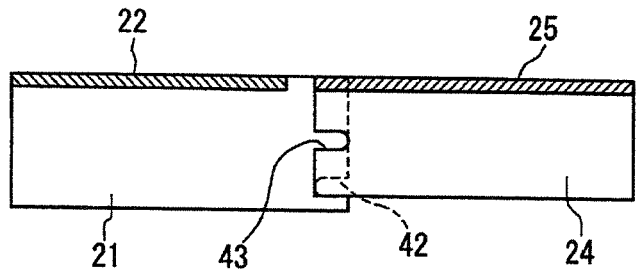

FIGS. 9A and 9B show a water discharging structure according to a fourth embodiment of the present invention.

In the present embodiment, a drain cutout portion 42 is provided from the opening end at the front end portion lower surface side of the first waterproof material I formed of the waterproof sheet 21. Furthermore, a drain cutout portion 43 is also provided at the front end portion lower surface side of the second waterproof material II formed of the waterproof sheet 24.

The drain cutout hole 42 of the first waterproof material I is situated at the lower peak portion and the drain cutout hole 43 of the second waterproof material II is situated so as not to overlap with the drain cutout hole 42.

In this manner, by providing the drain cutout hole portions 42 and 43 at both the first waterproof material I and the second waterproof material II, drain performance of both of the electric wire groups are improved and the electric wire groups are prevented from being exposed to the outside and the interference from outside interference material is prevented, whereby protection of the electric wire group can be promoted.

The rest of the configuration is the same as the first and third embodiment, and thus, the same reference numerals are denoted and the description thereof will be omitted.

Figure 10:
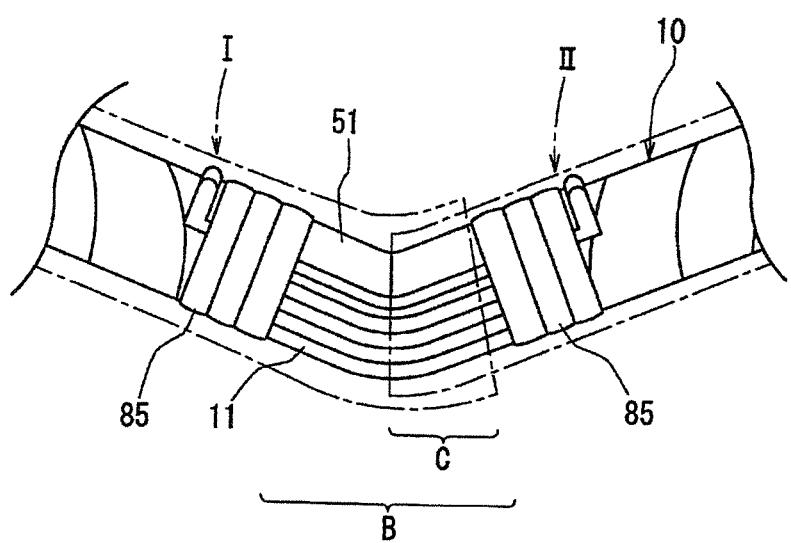
FIG. 10 is a perspective view of a principal part showing a water discharging structure according to a fifth embodiment.

FIG. 10 shows a water discharging structure according to a fifth embodiment of the present invention.

In the present embodiment, on the upper surface of the lower end position B of the wire harness 10, a bend holding plate 51 which is bent in a V shape is disposed, both end portions of the bend holding plate 51 is wound around and fixed to the electric wire group 11 by a tape 85. The first waterproof material I and the second waterproof material II is wound around and fixed to the outside of the bend holding plate 51.

By attaching the bend holding plate 51, the bent shape of the wire harness 10 bent in the lower end position B can be stably held, whereby it is possible to prevent a decline in drain function due to the position deviation between the lower end position B and the wrapped portion C of the first waterproof material I and the second waterproof material II.

In addition, a fastening band may be used instead of the tape 85.

Figure 11A:
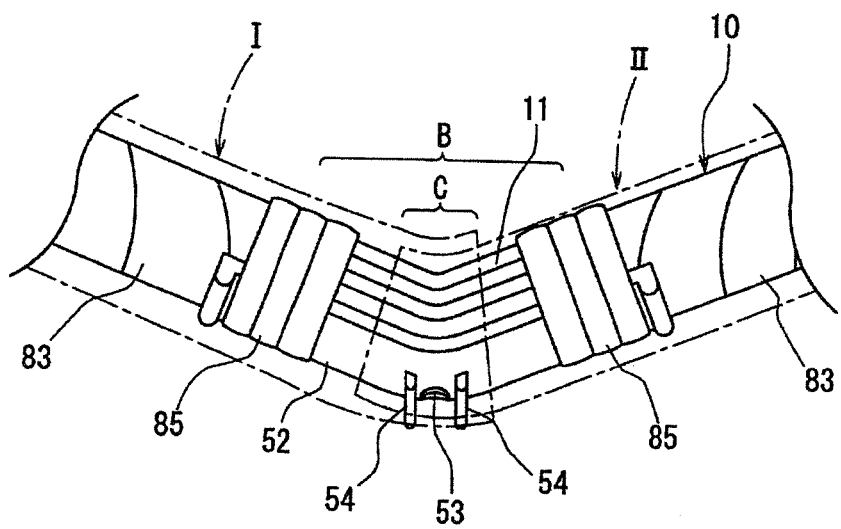
FIGS. 11A and 11B show a water discharging structure according to a sixth embodiment.
Figure 11B:
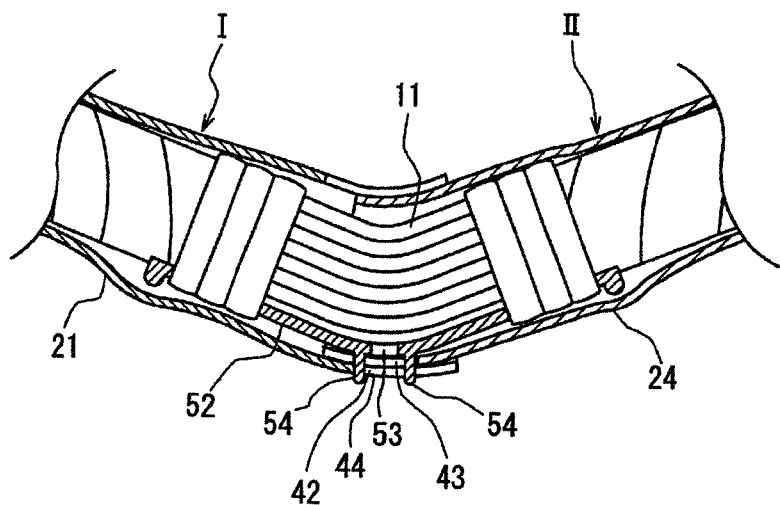

FIGS. 11A and 11B show a water discharging structure according to a sixth embodiment of the present invention. In the present embodiment, on the lower surface of the lower end position B of the wire harness 10, a bend holding plate 52 bent in a V shape is disposed, and both end portions of the bend holding plate 52 are wound and fixed around the electric wire group 11 by the tape 85.

In the bend holding plate 52, the water discharging hole 53 is provided at the lower peak portion and protective walls 54 protrude from both sides of the water discharging hole 53.

In the lower end position B, the first waterproof material I provided with the drain cutout portion 42 and the second waterproof material II provided with the drain cutout portion 43 are wound and fixed from the outside of the bend holding plate 52 in a position where the drain cutout portions 42 and 43 overlap with each other. As shown in FIG. 11B, the protective wall 54 of the bend holding plate 52 protrudes to the outside from the drain cutout portion 42 of the first waterproof material I and the drain cutout portion 43 of the second waterproof material II.

Figure 12A:
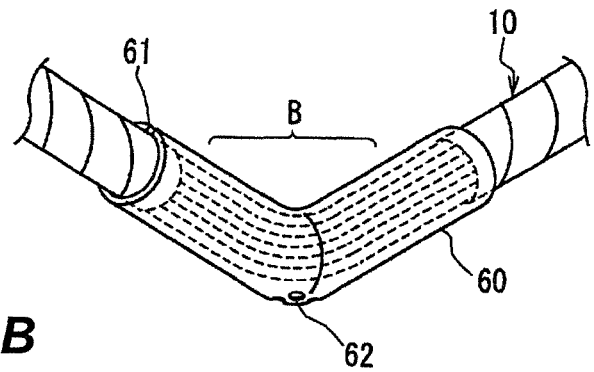
FIGS. 12A and 12B show a water discharging structure according to a seventh embodiment.
Figure 12B:
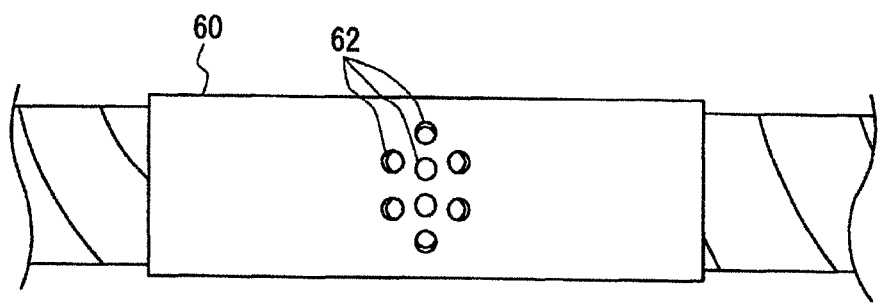

FIGS. 12A and 12B show a water discharging structure according to a seventh embodiment of the present invention.

In the present embodiment, instead of the first waterproof materials and the second waterproof materials of the first to sixth embodiments, in the lower end position B of the wire harness 10, a waterproof tube 60 made of vinyl chloride or polypropylene molded in a V shape in advance is provided with an outer covering. The electric wire group is inserted into the both end opening portions of the waterproof tube 60 in the state of being half-wrapped by the adhesive tape 83, and the electric wire group is exposed without being wound by the tape at the inside of the waterproof tube 60 including the lower peak portion.

The waterproof tube 60 has a slit 61 over the whole length in the longitudinal direction of the upper surface side and is attached to the wire harness 10 from the side part by opening the slit 61. Furthermore, in the V shaped lower peak portion of the waterproof tube 60, a plurality of small water discharging holes 62 is formed.

Even in the present embodiment, it is possible to effectively drain water from the lower end position B where water gathers via the plurality of small water discharging holes 62. Furthermore, by forming the water discharging hole as the plurality of small holes 62, it is possible to prevent interference on the electric wire exposure portion from a small stone, a panel or the like while securing a required water discharging hole area.

In addition, since the waterproof material may be formed merely by attaching the waterproof tube 60 which is one component molded in a V shape, the number of components and the number of attachment operation processes can be reduced.

Figure 13A:
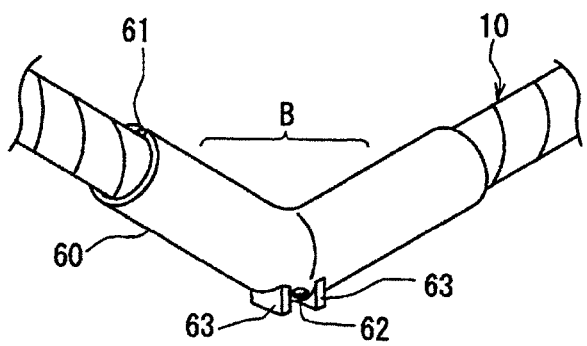
FIGS. 13A and 13B show a water discharging structure according to an eight embodiment.
Figure 13B:
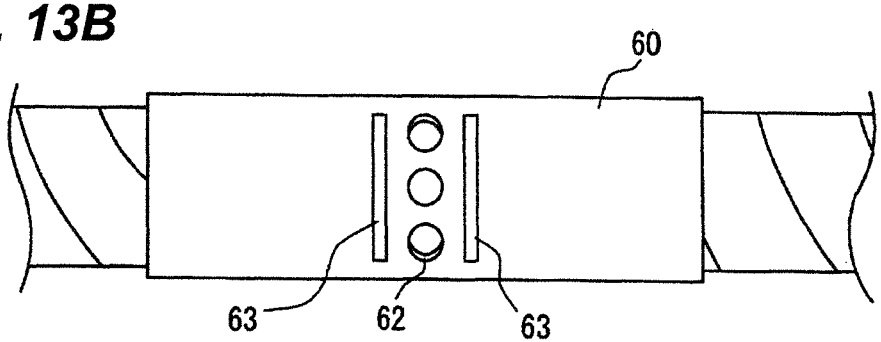

FIGS. 13A and 13B show an eighth embodiment of the present invention.

Similarly to the seventh embodiment, in the present embodiment, the waterproof tube 60 is provided with an outer covering in the lower end position B of the wire harness 10, but at both sides of the plurality of small water discharging holes formed in the lower peak portion of the waterproof tube 60, protective ribs 63 protrude downward.

Due to the protective ribs 63, it is possible to impede foreign matter from entering in from the small water discharging hole 62 into the waterproof tube 60, whereby damage of the electric wire exposure portion can be more reliably prevented.

In any of the embodiments described above, it is desirable that the drain portion A of the wire harness 10 is formed in the shape bent in the lower end position B in advance.

Figure 14A:
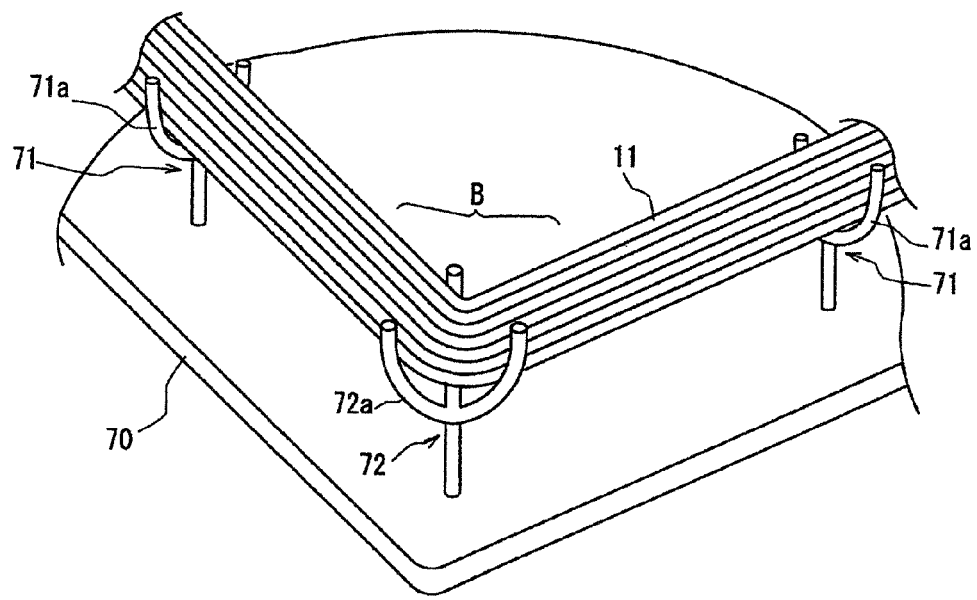
FIGS. 14A and 14B are perspective view showing a production method of a wire harness according to each embodiment.
Figure 14B:
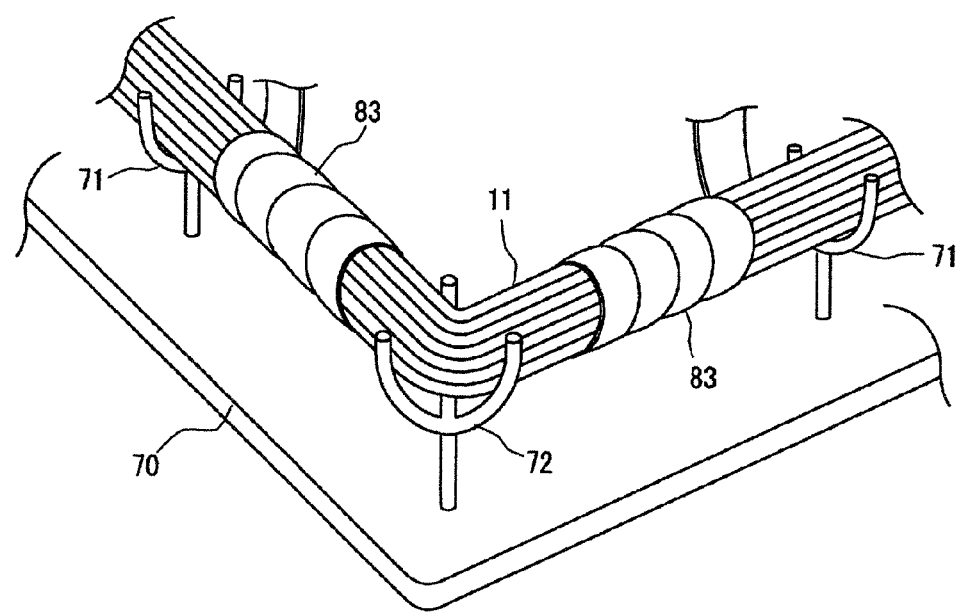

FIGS. 14A and 14B show a production method of the wire harness 10 having the bent shape.

As shown in FIG. 14A, on an assembly worktable 70, the electric wire group 11 is supported by a wire receiving portion 71a of a wiring jig 71 standing up from the assembly worktable 70 and is wired in a horizontal direction. Furthermore, the electric wire group 11 is inserted into a wire receiving portion 72a of a bent wiring jig 72 standing up in a portion which is the lower end position B at the time of vehicle wire arrangement and the wiring path is bent in the horizontal direction, and then, as shown in FIG. 14B, the tape 83 is half-wrapped and bound around the electric wire group 11 of areas except for the bend portion which is the lower end position B.

The portion that is bent on the assembly worktable 70 in the horizontal direction can form the lower end position B protruding downwardly in a V shape by changing the direction to the vertical direction at the time of the vehicle wire arrangement.

In this manner, in the production process of the wire harness 10, by bending and binding the electric wire group 11 in the lower end position B in advance, the wire length of the inner peripheral side (the upper surface side of the lower end position B) of the bend position can be set to be short, and the wire length of the outer peripheral side (the lower surface side of the lower end position B) can be set to be long, whereby the bent shape can be stably held.

Figure 15:
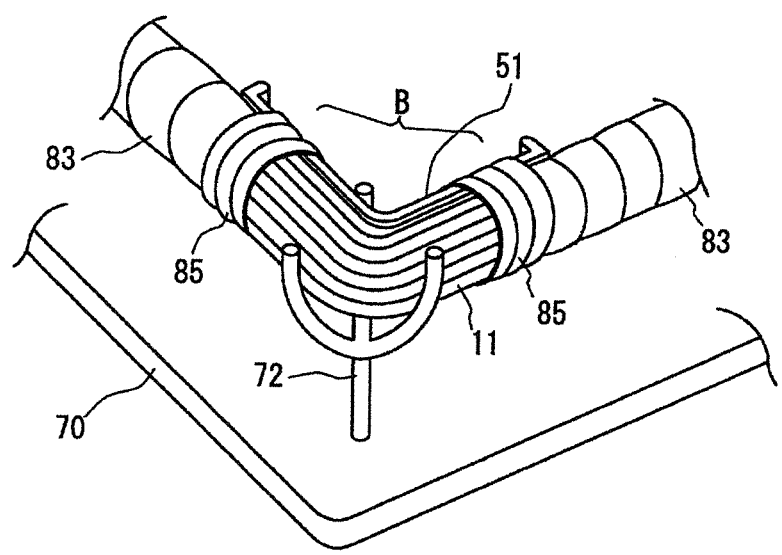
FIG. 15 is a perspective view showing a production method of a wire harness in a case where a bend holding plate is attached to an upper surface side of a lower end position of a wire harness.

Moreover, in a case where the bend holding plate 51 is attached to the upper surface side of the lower end position B as in the fifth embodiment, as shown in FIG. 15, on the assembly worktable 70, the bend holding plate 51 is disposed at the inner peripheral side that is bent by a bend wiring jig 72, and the bend holding plate 51 and the electric wire group 11 is wound and fixed by the tape 85. At the time of the vehicle wire arrangement, the direction of the bend portion is changed to the vertical direction, and as shown in FIG. 10, the bend holding plate 51 is disposed at the upper surface side of the lower end position B and the electric wire group 11 is exposed to the lower surface side.

Figure 16:
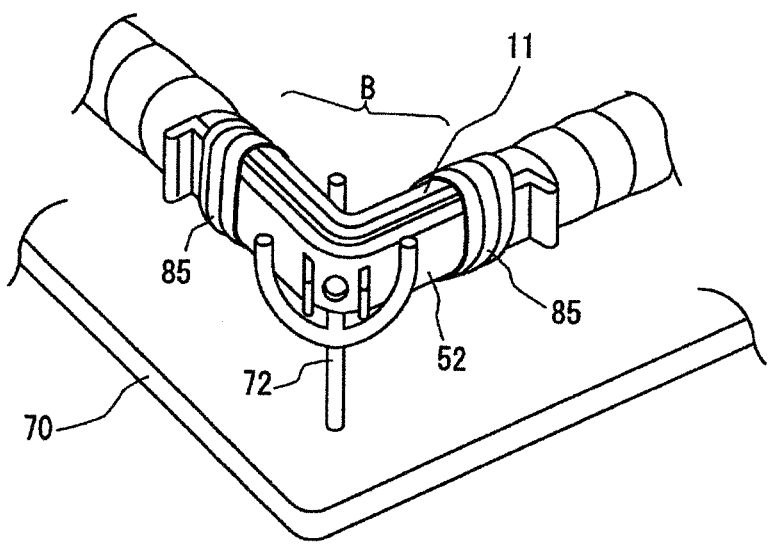
FIG. 16 is a perspective view showing a production method of a wire harness in a case where a bend holding plate is attached to a lower surface side of a lower end position of a wire harness.
Figure 17:
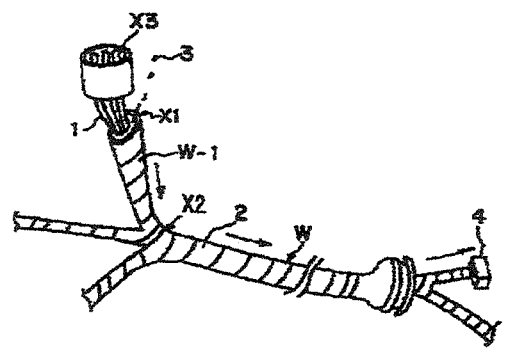
FIG. 17 is a perspective view showing an entering path of water to a wire harness.
Figure 18:
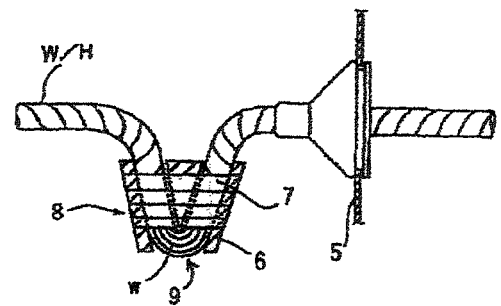
FIG. 18 is a diagram of an example of the related art.

Even in a case where the bend holding plate 52 is attached to the lower surface side of the lower end position B as in the sixth embodiment, as shown in FIG. 16, on the assembly worktable 70, the bend holding plate 52 is disposed at the outer peripheral side of the portion that is bent by the bend wiring jig 72, and the bend holding plate 52 and the electric wire group are wound and fixed by the tape 85. At the time of the vehicle wire arrangement, the direction of the bend portion is changed to the vertical direction, and as shown in FIG. 11A, the bend holding plate 52 is disposed at the lower surface side of the lower end position B.

If the electric wire group constituting the wire harness 10 is once bent, it is not naturally restored to a linear shape, and thus, as described above, at the time of the wiring operation of the wire harness, when the bending is added to a portion which becomes the drain lower end position, it is possible to easily form a drain portion that is bent downward in a V shape.

The invention claimed is:

1. A water discharging structure of a wire harness in a vehicle, the wire harness having a lower end position, the water discharge structure comprising:
 a tape half-wrapped around an electric wire group of the wire harness and passed through an inner portion of a tube formed of an annular tube or a corrugated tube made of resin so that the electric wire group is exposed without the tape and without being passed through the tube at the lower end position of the wire harness;
 an outer covering of a first waterproof material provided around the electric wire group at a location overlapping the lower end position, the first waterproof material being opened at the lower end position, an outer covering of a second waterproof material provided around the electric wire group at a location overlapping the lower end position, a front end portion of the second waterproof material being inserted in and substantially surrounded by an inner portion of the first waterproof material from the opened part of the first waterproof material at the lower end position, and a water discharging gap is opened between the first waterproof material and the front end portion of the second waterproof material; and
 the first waterproof material is formed of a first waterproof tube having a slit in a longitudinal direction or a first waterproof sheet wound around the electric wire group, and is attached to the electric wire group from a side part perpendicular to the longitudinal direction and the second waterproof material is formed of a second waterproof tube having a slit in a longitudinal direction or a second waterproof sheet wound around the electric wire group, and is attached to the electric wire group from a side part perpendicular to the longitudinal direction.

2. The water discharging structure of the wire harness according to claim 1, wherein
 the first waterproof material is formed of the first waterproof sheet and is made of resin, the first waterproof sheet is wound around the electric wire group, and both side ends thereof are joined and fixed to each other, the second waterproof material is formed of the second waterproof tube and is made of resin, and a volume in which the electric wire group is surrounded by the waterproof sheet is larger than that of the second waterproof tube.

3. The water discharging structure of the wire harness according to claim 1, wherein:
 a drain cutout portion is provided on lower surfaces of front end portions of the second waterproof material that is substantially surrounded by the first waterproof material; or
 a drain cutout portion is provided from the opening end on a lower surface of the first waterproof material, and a drain cutout portion is provided from the front end of the second waterproof material substantially surrounded by the first waterproof material and at a position that does not overlap with the drain cutout portion of the first waterproof material.

4. The water discharging structure of the wire harness according to claim 1, wherein
 the wire harness with an area which is provided with an outer covering of the second waterproof material and the first waterproof material is formed in a V shape in which the lower end position is protruded downward.

5. The water discharging structure of the wire harness according to claim 4, wherein
 a V shaped bend holding plate is disposed on an upper surface of a bent portion of the wire harness, the bend holding plate is wound around the electric wire group by a tape or attached by a fastening band, and together with the electric wire group, the bend holding plate is provided with an outer covering of the first waterproof material and the second waterproof material.

6. The water discharging structure of the wire harness according to claim 1, wherein:
 on a lower surface of the wire harness with an area that is provided with an outer covering of the first waterproof material and the second waterproof material, a V-shaped bend holding plate is disposed, the bend holding plate is wound around the electric wire group by a tape or attached by a fastening band, a water discharging hole is formed in a lower peak portion and protective walls protrude from both sides of the water discharging hole; and
 drain cutout portions are provided from a front ends of the first waterproof material and the front end of the second waterproof material, the drain cutout portions overlap with each other, and the protective walls of the bend holding plate protrude from the drain cutout portions to the outside.

7. A water discharging structure of a wire harness, wherein:
 at both side portions pinching therebetween a lower end position of a wire harness arranged in a vehicle, a tape is half-wrapped around an electric wire group of the wire harness and is passed through an inner portion of a tube formed of an annular tube or a corrugated tube made of resin, and at the lower end position, the electric wire group is exposed without the tape winding or the tube being provided as an outer covering;
 a V-shaped bent area where the electric wire group is exposed is provided with an outer covering of a waterproof tube that is molded in a V shape, and a plurality of small water discharging holes is arranged in a lower peak portion of the waterproof tube; and
 the waterproof tube has a slit in a longitudinal direction throughout a length of an upper surface of the waterproof tube and is attached to the electric wire group from a side part perpendicular to the longitudinal direction.

8. The water discharging structure of the wire harness according to claim 7, wherein
 protective ribs protrude from the waterproof tube at both sides of the small water discharging holes.

9. A method of manufacturing a wire harness for a vehicle wire arrangement having the water discharging structure according to claim 6, wherein:

on an assembly worktable of the wire harness, an electric wire group is supported by a wiring jig standing up from the assembly worktable and is wired in a horizontal direction, and a wiring path is bent and wired in a portion which is a lower end position at the time of a vehicle arrangement, and both sides of a bended portion are provided with an outer covering by the first waterproof material and the second waterproof material;

a V shaped bend holding plate is wound around the electric wire group by a tape or attached by a fastening band, and the bend holding plate attached to an outer peripheral side of the bend portion provides a water discharging hole at a lower peak; and a direction of a portion bent in the horizontal direction on the assembly worktable is changed to a vertical direction at the time of the vehicle arrangement, the V-shaped bend holding plate is disposed at an upper surface side or a lower surface side, and the electric wire group is exposed at the lower surface side.

\* \* \* \* \*